United States Patent [19]

Auvity et al.

[11] Patent Number: 4,995,554
[45] Date of Patent: Feb. 26, 1991

[54] CONTROL UNIT FOR A HEATING, VENTILATING AND/OR AIR CONDITIONING INSTALLATION FOR AN AUTOMOTIVE VEHICLE

[75] Inventors: Michel Auvity, Velizy; Patrice Chesnier, Asnieres, both of France

[73] Assignee: Valeo, Paris, France

[21] Appl. No.: 352,028

[22] Filed: May 15, 1989

[30] Foreign Application Priority Data

May 17, 1988 [FR] France ............................ 88 06593

[51] Int. Cl.⁵ ........................................ G05D 23/00
[52] U.S. Cl. .................................. 236/51; 74/552; 251/294
[58] Field of Search ............... 236/51; 137/637.2; 251/294; 74/552, 10, 27

[56] References Cited

U.S. PATENT DOCUMENTS

| | | | |
|---|---|---|---|
| 2,614,851 | 10/1952 | Parker | 137/637.2 |
| 2,634,670 | 4/1953 | Simons | 98/2.06 |
| 3,125,111 | 3/1964 | Daly | 236/51 X |
| 3,203,258 | 8/1965 | Grayson | 236/51 X |
| 3,393,706 | 7/1968 | Burhop | 137/637.2 |
| 3,411,541 | 11/1968 | Hindman et al. | 137/637.2 |
| 3,637,188 | 1/1972 | Ung | 137/637.2 X |
| 4,325,508 | 4/1982 | Kunz | 251/294 X |
| 4,584,726 | 4/1986 | Gulls et al. | 251/294 X |
| 4,681,255 | 7/1987 | Drost | 236/51 |

FOREIGN PATENT DOCUMENTS

| | | |
|---|---|---|
| 0149397 | 7/1985 | European Pat. Off. |
| 2415333 | 8/1979 | France |
| 860134 | 2/1961 | United Kingdom |

OTHER PUBLICATIONS

Patent Abstracts of Japan, vol 6, No. 256, Dec. 15, 1982, JP-A-57 151 414.

Primary Examiner—William E. Tapolcai
Attorney, Agent, or Firm—Dennison, Meserole, Pollack & Scheiner

[57] ABSTRACT

A control unit for a heating and ventilating installation for an automotive vehicle, with or without air conditioning, comprises a module in the form of a housing, with two coaxial rotatable control knobs projecting from the outside of the housing and two coaxial shafts coupled respectively with the two knobs, each shaft rotating with the corresponding knob. Each shaft is also coupled with one of two transmission members rotatable with the corresponding shaft, the transmission members being mounted within the housing and arranged to act respectively on temperature regulating means and air distribution means of the vehicle, for passing the air into the passenger compartment or cab. The control unit also has a fixed intermediate sleeve arranged between the two shafts so as to prevent any interaction between the two control knobs.

8 Claims, 2 Drawing Sheets

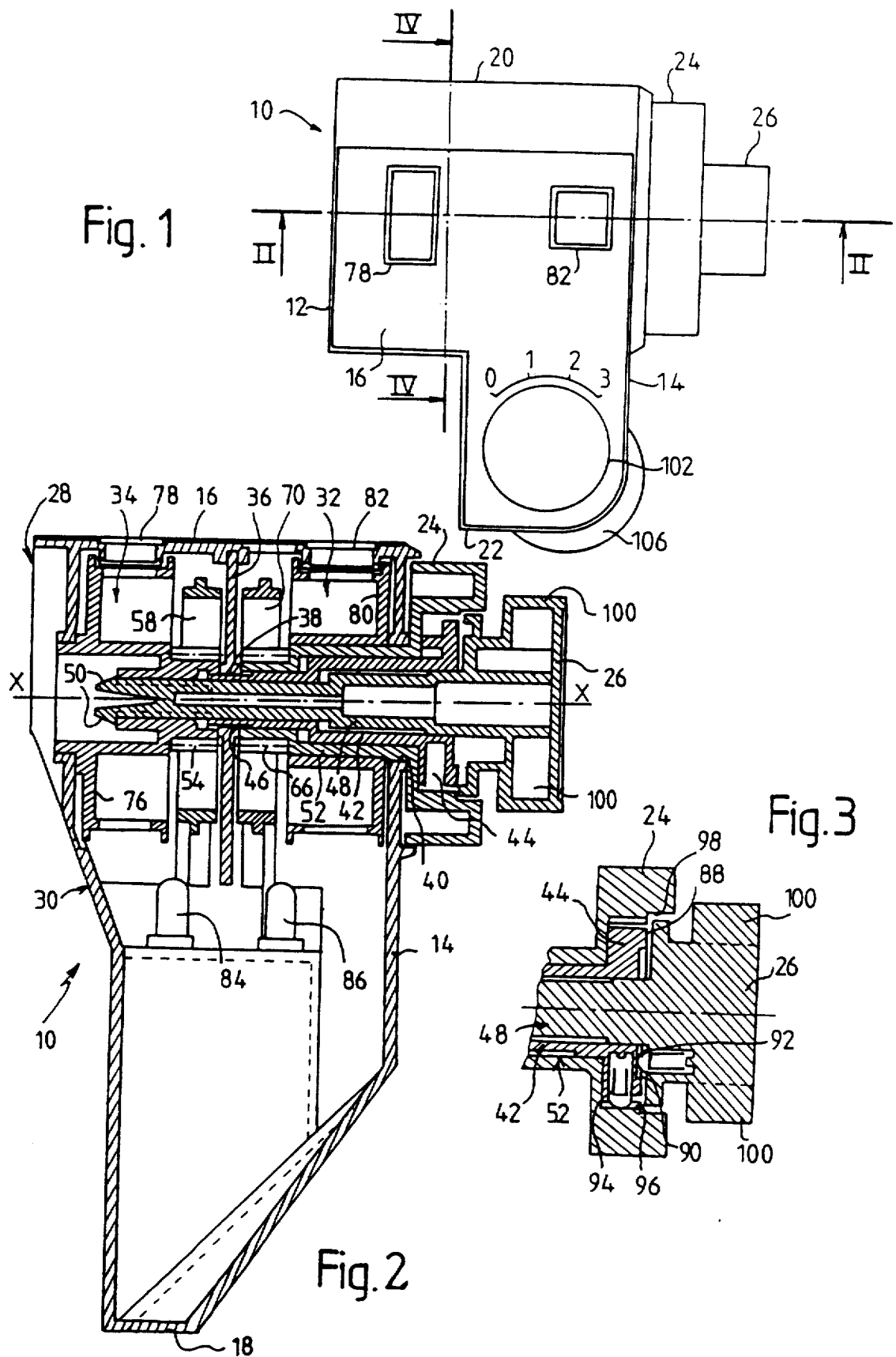

CONTROL UNIT FOR A HEATING, VENTILATING AND/OR AIR CONDITIONING INSTALLATION FOR AN AUTOMOTIVE VEHICLE

FIELD OF THE INVENTION

This invention relates to a control unit for a heating, ventilating and/or air conditioning installation for an automotive vehicle.

BACKGROUND OF THE INVENTION

In one type of installation of the above kind, cold air is drawn from outside the interior (i.e. the passenger compartment or cab) of the vehicle, optionally through an air conditioning unit, into the interior of the vehicle after being heated if necessary. The treated air is admitted to the interior of the vehicle through various inlet ports situated in particular locations. Commonly, cold or heated air can be admitted in the form of a forced draught set up by a forced draught unit including a variable speed rotary device such as a fan or blower.

The control system for such an installation essentially includes two control members which are adapted to regulate the temperature and the distribution, respectively, of the air to be passed into the interior of the vehicle. A control member for the forced draught unit, and another control member for the air conditioning unit (if the vehicle is equipped with such an option) are also generally provided. This kind of control system, in which the above mentioned control members consist of knobs, sliding cursors, levers etc., are usually mounted on the fascia panel of the vehicle.

Such known arrangements have the disadvantage that they do occupy space on the fascia panel, which already carries other controls and instruments. In addition, control systems of this type do not lend themselves to a particularly compact grouping of the control members such as levers and so on. There is a tendency to give rise to interactions between the various control members, for example between the heating control and the air distribution control.

SUMMARY OF THE INVENTION

In consequence of the above, one object of the invention is to provide a control unit, for a heating, ventilating and/or air conditioning unit for an automotive vehicle, in which the above disadvantages of prior art arrangements can be avoided, while also providing a smaller control system in which the various control functions can be accessed through grouped controls.

According to the invention, such a control unit comprises: a module in the form of a housing; two control knobs; and means mounting the two control knobs to the housing, coaxially with each other with the control knobs projecting rotatably from the outside of the housing. This mounting means comprises two coaxial shafts comprising an inner shaft and an outer shaft, each connected for rotation with a respective one of the two said control knobs for rotation with it. The said inner shaft is rotatably coupled with one of two transmission members, while the outer shaft is similarly rotatably coupled with the other transmission member. The transmission members are mounted within the housing in such a way that they act, respectively, on a temperature regulating means and on an air distribution means for air to be passed into the interior of the vehicle. The control unit further comprises a fixed intermediate sleeve disposed between the two said shafts over at least part of the length of the latter, so as to prevent any interaction between the said control knobs. Such an arrangement gives a control unit which is particularly compact, and which can be mounted between the steering wheel and the fascia panel so as to avoid encumbering the latter. In addition the two control knobs can be operated by the driver without taking his hands off the steering wheel. Besides this, the presence of the intermediate sleeve ensures positively that the operation of one of the control knobs does not in any way affect the other control knob.

Preferably, the housing includes an intermediate bulkhead extending perpendicular to the axis of the two said shafts and dividing the interior of the housing into a first compartment and a second compartment, the said one transmission member being mounted within the first compartment and the said other transmission member being mounted within the second compartment, the bulkhead having a through hole, the said inner shaft extending the full length of the first compartment and further extending into the second compartment through the said hole, the outer shaft extending only within the first compartment.

According to another feature of the invention, the control unit further comprises two indicating drums, coupled respectively with the inner shaft and the outer shaft for respective rotation therewith and disposed within the housing, each said indicating drum carrying appropriate symbols and the housing having a front wall defining two windows, with each drum being located behind a respective one of said windows so the said symbols can be seen through the corresponding window.

Preferably, the intermediate sleeve includes a terminal crown portion having notch means cooperating with the said control knobs so as to maintain them in stable and well defined positions of rotation.

The control unit according to the invention is applicable in practice both where the transmission members are of a mechanical type and where they are electrical.

The description which follows is given solely by way of example and with reference to the accompanying drawings.

BRIEF DESCRIPTION OF THE DRAWINGS

FIG. 1 is a view in elevation showing a control unit according to the invention.

FIG. 2 is a view in cross section, taken on the line II—II in FIG. 1 but on a larger scale.

FIG. 3 is a detail of FIG. 2.

DESCRIPTION OF PREFERRED EMBODIMENTS

Figure 4:
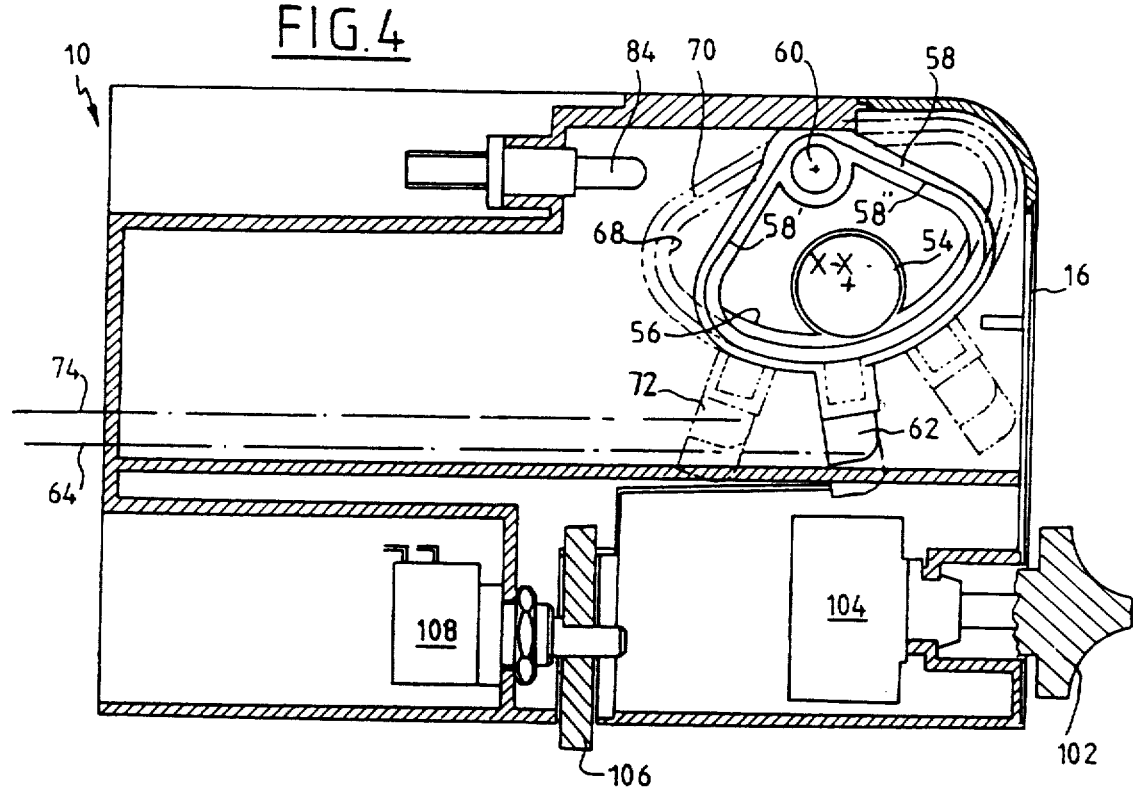
FIG. 4 is a view in cross section taken on the line IV—IV in FIG. 1.

The control unit shown in FIGS. 1, 2 and 4 comprises a module 10 in the form of a housing which is delimited mainly by two side walls 12 and 14, a front wall 16, a back wall 18, a top wall 20 and a bottom wall 22. On the outside of the side wall 14, there are two projecting control knobs 24 and 26, mounted coaxially with each other and rotatable about an axis XX, for controlling respectively a suitable means for distributing air, and a suitable means for controlling the temperature of the air to be passed into the interior (i.e. the passenger compartment or the cab, as appropriate) of a vehicle. The housing 10 is preferably made of synthetic plastics material, and comprises two members 28 and 30, joined together through mating edges passing through a plane containing the axis XX (FIG. 2). The interior of the housing 10 is divided into two compartments 32 and 34, by means of an intermediate bulkhead 36, which extends at right angles to the axis XX and which has a circular hole 38 lying on the axis XX.

The side wall 14 has a circular hole 40, which also lies on the axis XX. An intermediate sleeve member 42 extends into the first compartment 32 between the side wall 14 and the intermediate bulkhead 36. The sleeve 42, which again lies on the axis XX, has a stepped form, and includes a terminal crown portion 44 which projects from the exterior of the housing 10. The opposite end 46 of the sleeve 42 is engaged, for example by a suitable clip type fastener, in the hole 38 formed in the bulkhead 36, so as to secure the sleeve 42 against rotation. The sleeve 42 acts as an internal guide for an inner shaft 48 which extends from the control knob 26 (with which it is integral in this example), so as to extend right through the first compartment 32 and terminate in the second compartment 34. The free end of the shaft 48 carries retaining teeth 50. The sleeve 42 also acts as an external guide for an outer shaft 52 having a stepped form and extending, again integrally in this example, from the control knob 24. The shaft 52 only extends into the first compartment 32.

Close to the free end of the inner shaft 48, and within the compartment 34, there is a toothed pinion 54, which is carried by the shaft 48 for rotation with it (FIGS. 2 and 4). The pinion 54 cooperates with a toothed sector 56 of an actuating member 58. In this example the actuating member 58 comprises two levers 58', 58" extending from the respective ends of the sector 56 at one end of each lever, with the other ends of these levers joined together in a pivot portion of the member 58, whereby the latter is pivotable about an axis 60. The actuating member 58 also has a finger 62 which is connected to a flexible cable 64, which acts on the air distribution means mentioned above. The latter is typically part of an installation for heating, ventilation and/or air conditioning. The cable 64 is arranged to control, in a manner known per se, the respective positions of air distribution flaps (not shown) so as to distribute the air between the different air inlets to the interior of the vehicle.

The free end of the outer shaft 52 carries a pinion 66 similar to the pinion 54. The pinion 66 cooperates with the toothed sector 68 of another actuating member 70, which is similar to the actuating member 58 and which is also pivotally mounted about the axis 60. The actuating member 70 has a finger 72 which operates a flexible cable 74 for controlling the above mentioned temperature control means (not shown) of the installation. The cable 74 may for example control a mixing valve (not shown) which controls the air temperature by mixing a stream of hot air with a stream of cold air.

A temperature indicating drum 76 is secured to the inner shaft 48, for rotation with the latter, by means of the retaining teeth 50. The temperature indicating drum 76 lies within the second compartment 34, and has appropriate symbols on its outer periphery which can be read through a window 78 formed in the front wall 16.

Another indicating drum 80 is mounted on the outer shaft 52, and has symbols on its outer surface which can be read through a second window 82 formed in the front wall 16.

The two indicating drums 76 and 80 are made of a translucent material, and at least one lamp is provided within the housing 10 so as to illuminate the symbols visible through the windows 78 and 82. In this example, these two lamps are shown at 84 and 86, on either side of the bulkhead 36 so that each lamp illuminates a respective one of the two internal compartments 34, 32 respectively of the housing.

As is shown in FIG. 3, the crown portion 44 of the sleeve member 42 has on its outer face 88 a set of notches 90, which cooperate with a pin 92. The control knob 26 carries a spring, not shown, which acts on the pin 92. Similarly, the periphery of the crown portion 44 carries a spring loaded pin 94 cooperating with notches 96 formed on an inwardly facing angular wall 98 of the air flow distribution control knob 24. In this way, the two control knobs 24 and 26 can be adjusted into rotational positions which are stable and well defined without the risk of any interaction between the two knobs. In addition, the temperature regulating knob 26 has two projecting finger portions 100 (FIGS. 2 and 3) to facilitate its adjustment.

On the front face 16 of the housing 10 (FIGS. 1 and 4) there is another control knob 102. This acts on the air supply regulating means, i.e. it controls the operating speed of a conventional forced draught supply unit, not shown. Associated with the knob 102 are conventional symbols 0, 1, 2 and 3 for selecting the required speed for the forced draught fan or blower. The knob 102 is mounted on the spindle of a potentiometer 104 mounted inside the housing 10 (FIG. 4).

In addition, if the vehicle is fitted with air conditioning means (not shown), the housing carries a further knob 106, here in the form of a thumb wheel (FIGS. 1 and 4), mounted on the spindle of a potentiometer 108 for regulating the air conditioning means. The potentiometer 108 acts directly on a thermostat of the air conditioning means, for example.

A control unit such as that shown in FIGS. 1 to 4 can be installed in a region lying between the fascia panel and the steering wheel of the vehicle, with the axis XX of the two main control knobs orientated in a direction which is generally at right angles to the steering wheel axis. The front face 16 of the housing should be so placed as to be easily visible to the driver.

Figure 5:
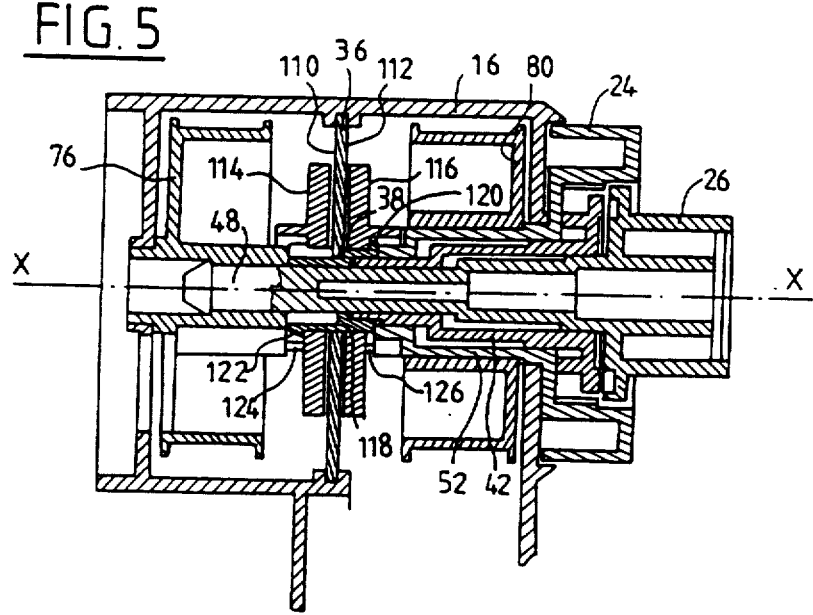
FIG. 5 is a partial view in cross section, similar to that of FIG. 2 but showing a modification.

Referring now to FIG. 5, this shows a modification for use where the regulation of temperature and air distribution to the interior of the vehicle is controlled electrically, instead of mechanically as in the previous figures. In this case, the intermediate bulkhead 36 carries printed circuit on both of its faces 110 and 112. The transmitting members then comprise two cursors 114 and 116, which are coupled with the shafts 48 and 52 respectively, for rotation therewith, and which are adapted to cooperate respectively with the printed circuits carried by the bulkhead 36. The hole 38 in the bulkhead accommodates a bush 118 which is provided at one end with a retaining flange or crown 120 for ensuring engagement of the cursor 116 with one of the printed circuits. The other end of the bush 118 carries resilient fingers 122 for ensuring engagement of the cursor 114 against the other printed circuit. The cursor 114 is driven in rotation by means of the indicating drum 76, through the fingers 124 of the cursor 114 which cooperate with the drum 76. In a similar way the cursor 116 has fingers 126 cooperating with the indicating drum 80.

The two printed circuits and cursors 114 and 116 make it possible to control by purely electrical means the temperature and the air distribution into the interior of the vehicle. Given that the bulkhead 36 is connected with an electrical supply, it is then easy to include one or more light bulbs, supplied through the bulkhead, for illuminating the drums 76 and 80.

What is claimed is:

1. A control unit for an installation for heating, ventilating and/or air conditioning of an automotive vehicle, wherein the control unit comprises: a module in the form of a housing; two control knobs; means mounting the two control knobs to the housing, coaxially with each other with the control knobs projecting rotatably from the outside of the housing, the said mounting means comprising two coaxial shafts, namely an inner shaft and an outer shaft, each connected with a respective one of the two said control knobs for rotation therewith; two transmission members, the said inner shaft having means rotatably coupling it with one said transmission member and the outer shaft having means rotatably coupling it with the other transmission member; and means mounting the transmission members within the housing, the said transmission members being arranged to act respectively on temperature regulating means and on air distribution means for air to be passed into the interior of the vehicle, the control unit further comprising a fixed intermediate sleeve disposed between the two said shafts over at least part of the length of the latter so as to prevent any interaction between the said control knobs.

2. A control unit according to claim 1, wherein the housing of the module includes an intermediate bulkhead extending perpendicular to the axis of the two said shafts and dividing the interior of the housing into a first compartment and a second compartment, the said one transmission member being mounted within the first compartment and the said other transmission member being mounted within the second compartment, the bulkhead having a through hole, the said inner shaft extending the full length of the first compartment and further extending into the second compartment through the said hole, the outer shaft extending only within the first compartment.

3. A control unit according to claim 2, wherein the intermediate sleeve extends into the first compartment between a side wall of the housing and the intermediate bulkhead.

4. A control unit according to claim 1, further comprising two indicating drums, coupled respectively with the inner shaft and the outer shaft for respective rotation therewith and disposed within the housing, each said indicating drum carrying appropriate symbols and the housing having a front wall defining two windows, with each drum being located behind a respective one of said windows so the said symbols can be seen through the corresponding window.

5. A control unit according to claim 4, wherein the indicating drums are made of a translucent material, and further comprising at least one light source within the housing for illuminating the symbols visible through the said windows.

6. A control unit according to claim 1, wherein the intermediate sleeve includes a terminal crown portion having notch means cooperating with the said control knobs so as to maintain them in stable and well defined positions of rotation.

7. A control unit according to claim 1, wherein each said transmission member comprises an actuating member having a toothed sector and means for connecting the actuating member with an operating cable for the corresponding said regulating means, a first pinion mounted on the inner shaft and cooperating with one said toothed sector, and a second pinion mounted on the outer shaft and cooperating with the other toothed sector.

8. A control unit according to claim 2, wherein the intermediate bulkhead carries printed circuits on both its faces, the two said transmission members comprising cursors, each coupled with a respective one of the two said shafts for rotation therewith, each said cursor being so disposed as to cooperate with a respective one of the printed circuits.

* * * * *